United States Patent [19]

Xie et al.

[11] Patent Number: 5,758,963

[45] Date of Patent: Jun. 2, 1998

[54] DOUGH HOOK AND A FOOD MIXER UTILIZING SAID HOOK

[75] Inventors: Mark Mingjun Xie, Tipp City; Duane H. Friend, Montgomery, both of Ohio

[73] Assignee: Premark FEG L.L.C., Wilmington, Del.

[21] Appl. No.: 745,424

[22] Filed: Nov. 12, 1996

[51] Int. Cl.⁶ .................. A21C 1/02; A21C 1/14
[52] U.S. Cl. .................. 366/97; 366/197; 366/288
[58] Field of Search .............. 366/64–66, 96–98, 366/197, 203, 207, 288, 297–301, 342–343, 349

[56] References Cited

U.S. PATENT DOCUMENTS

| | | | |
|---|---|---|---|
| 1,175,530 | 3/1916 | Kirchhoff | 366/197 X |
| 1,746,384 | 2/1930 | De Long | 366/288 |
| 1,766,942 | 6/1930 | Rataiczak et al. | 366/288 |
| 1,826,242 | 10/1931 | Dehuff | 366/98 X |
| 1,859,690 | 5/1932 | Aeschbach | 366/98 |
| 2,306,245 | 12/1942 | Duke | 366/98 |
| 3,576,168 | 4/1971 | Thylstrup et al. | 366/98 |
| 4,049,243 | 9/1977 | Kramer | 366/98 |
| 4,070,711 | 1/1978 | Smader | 366/98 |
| 4,176,971 | 12/1979 | Ernster et al. | 366/298 |
| 4,277,181 | 7/1981 | Stahly et al. | 366/69 |
| 4,311,397 | 1/1982 | Wright | 366/98 |
| 4,337,000 | 6/1982 | Lehmann | 366/288 |
| 4,456,381 | 6/1984 | Inoue et al. | 366/97 |
| 4,718,771 | 1/1988 | Asai et al. | 366/97 |
| 4,790,665 | 12/1988 | Hayashi | 366/98 |

FOREIGN PATENT DOCUMENTS

| | | | |
|---|---|---|---|
| 525080 | 4/1931 | Germany | 366/197 |
| 1722351 | 3/1992 | U.S.S.R. | 366/97 |
| 335059 | 9/1930 | United Kingdom | 366/98 |
| 2072028 | 9/1981 | United Kingdom . | |

Primary Examiner—Charles E. Cooley
Attorney, Agent, or Firm—Thompson Hine & Flory LLP

[57] ABSTRACT

A dough hook for a planetary mixer, the use of which prolongs the life of mixer parts such as the shaft, gears and the hook itself and which is characterized in that the following points are located on common edge of the hook portion:

| Distance from Centerline of Hook Portion (in.) | Distance from Baseline of Hook Portion (in.) | Angle of Rotation (degrees) from a Fixed Point on said Hook Portion |
|---|---|---|
| 3.5 | 6.2 | 71.5 |
| 3.0 | 8.7 | 106 |
| 2.1 | 10.6 | 140 |
| 0 | 12.2 | 180 |

11 Claims, 6 Drawing Sheets

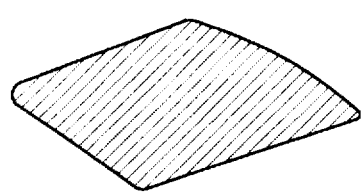
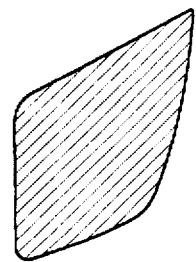
FIG. 5          FIG. 6
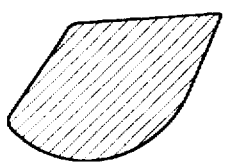
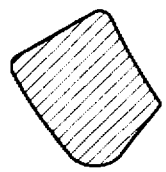
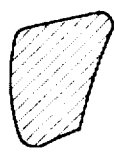
FIG. 7          FIG. 8          FIG. 9
FIG. 10         FIG. 11         FIG. 12

5,758,963

1

DOUGH HOOK AND A FOOD MIXER UTILIZING SAID HOOK

BACKGROUND OF THE INVENTION

The present invention relates to a dough hook and an apparatus for mixing dough using this hook, and more particularly, this invention relates to a mixer having a dough hook shaped such that a novel relationship between the dough hook and the inside surface of a mixing bowl is produced.

Industrial and domestic mixers are well known for mixing foodstuffs. Of these foodstuffs, dough can be kneaded in these mixers with the substitution of rotating dough hooks rather than the conventional beaters. However, as dough is dry and relatively heavy, it is very difficult to mix. Therefore, it places heavy loads on the mixer. Overloading when mixing heavy dough is a major problem, which causes motor overheating, break down, and oscillated on/off starts. Mixing heavy dough also leads to other problems such as transmission failure, bowl support breakage, and other electrical problems such as capacitor and switch failures.

Dough mixing process consists of two actions. The first is a mixing action to incorporate the ingredients. The other is a kneading action to develop the dough. The dough will get more energy through the kneading action and its temperature and elasticity rise in the process. Planetary mixers have been shown to supply both the needed mixing and kneading actions. A planetary shaft presents mixing action while an agitator shaft presents kneading action.

Therefore, it is an object of the present invention to modify the mixer to improve its reliability and reduce its load when mixing dough. It is a further object of this invention to optimize the design of the dough hook so as to reduce the peak load in mixing heavy dough and minimize the extra mixing time required to get the same quality dough. This will increase mixer life and reduce down time.

SUMMARY

Clearance between the dough hook of the mixer apparatus and the bowl plays an important role in dough development. If there is too much clearance, then the hook does not effectively reach the dough and the dough needs a much longer time to incorporate and develop. But if there is too little clearance, the hook pinches the dough very hard against the bowl. This requires very high horse power from the motor, causes very high load to all of the parts of the mixer, and wastes energy due to the pinching of the dough instead of the desired kneading action.

Therefore, the dough hook of the present invention is of a helical shape and is angled such that the clearance between the reach of the hook as it is rotated and the inner periphery of the bowl, is optimized. The clearance is such that it minimizes the load on the machine.

BRIEF DESCRIPTION OF THE DRAWINGS

FIGS. 5, 6, 7, 8, 9, 10, 11 and 12 are cross-sectional views of the dough hook of the present invention along the lines 5—5, 6—6, 7—7, 8—8, 9—9, 10—10, 11—11, and 12—12, respectively of FIG. 4.

DETAILED DESCRIPTION OF THE PREFERRED EMBODIMENT

This system will now be described in detail below with respect to the figures. It is to be understood that the forgoing general description and the following detailed description are exemplary and explanatory but are not to be restrictive of the invention. The accompanying drawings which are incorporated in and constitute a part of this invention, illustrate the embodiments of the invention, and, together with the description, serve to explain the principles of the invention in general terms. Like numerals refer to like parts throughout the disclosure.

Figure 1:
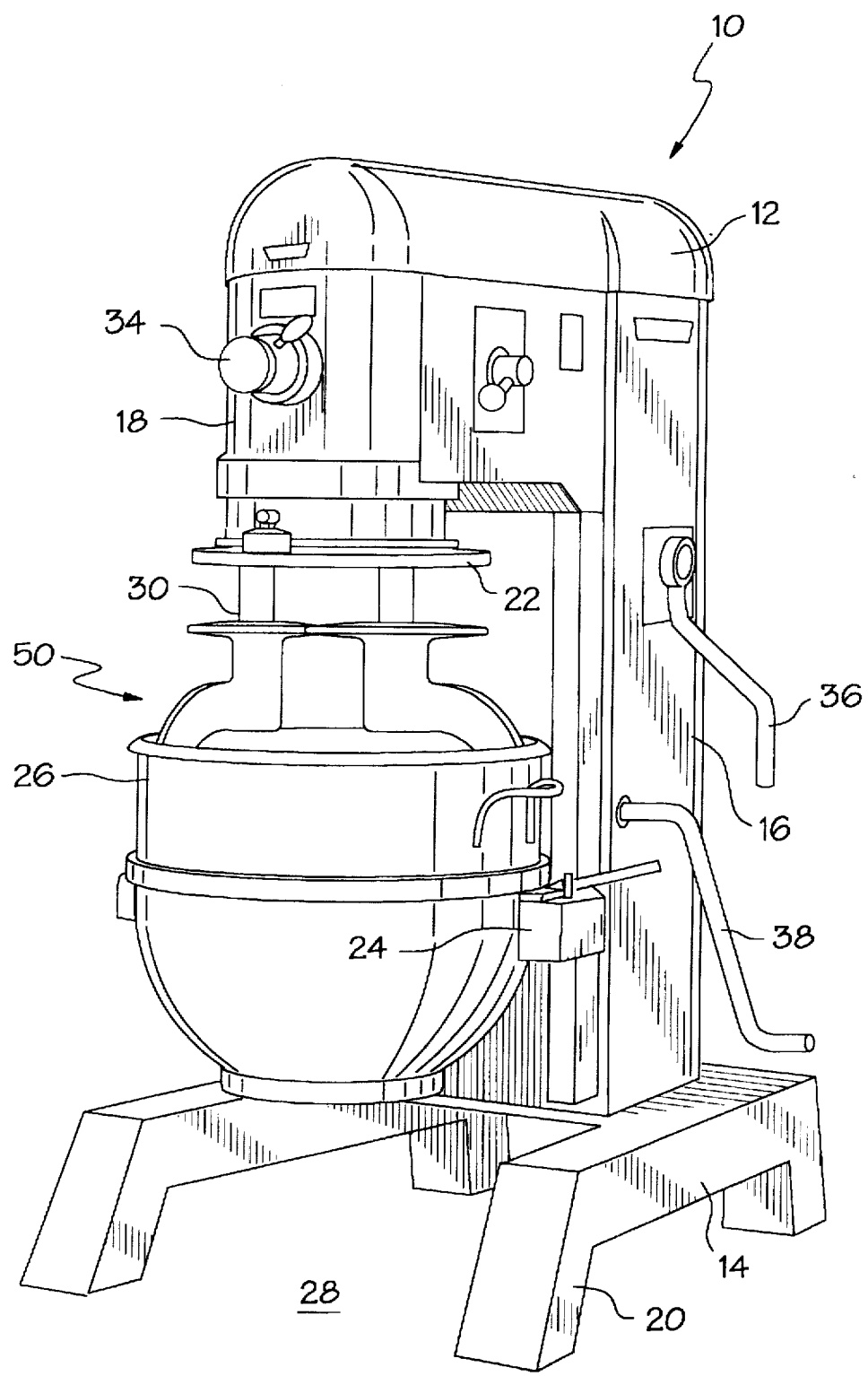
FIG. 1 is a planetary mixer which exemplifies the present invention.

Any type of planetary mixing machine known in the art may be used. However, the invention will be described with respect to the mixing machine 10 exemplified in FIG. 1. This mixing machine includes a housing 12 having a base 14, a supporting structure 16 and an arm 18 projecting from the upper end of the supporting structure. The base 14 is formed by two pairs of spaced legs 20. The support structure 16 extends vertically from the base 14 and the arm 18 projects horizontally from the support structure over the space between the pair of legs 20. The arm 18 carries a mounting member 22 for a mixing tool. The mixer 10 further includes an arcuate bowl support 24 mounted to the support structure 16. The bowl support 24 is semi-circular in shape and defines a recess to support a complementary, removable bowl 26 which contains the substance to be mixed. The support 24 holds the bowl 26 a distance from the surface 28 on which the feet 20 rest.

Arm 18 houses bearings and appropriate reduction system and transmission means as are known in the art which are driven by a motor housed in the structure 16. The mixer also includes a mixer shaft which is driven by the motor and is adapted for receiving the mixing tool. The drive system may include epi-cyclic or planetary gearing whereby the shaft rotates about its own axis and, at the same time revolves around a main vertical axis.

The mixer 10 also includes a mixing attachment drive head 30, an auxiliary attachment port 34 and a shift lever assembly 36. Mixing attachment drive head 30 extends from the mounting 22 of the arm 18 and is linked to a drive train which drives the attachment. This drive head drives the detachably mounted dough hook.

Bowl support 24 supports the mixing bowl 26 beneath the mixing attachment drive head 30. Crank 38 is rotatably mounted the housing 12 and is used to raise and lower the bowl 26 into position beneath the mixing attachment drive head 30.

The mixers come in a variety of size capacities. The volume of each of the bowls varies accordingly and is determined by the respective wall height of the bowl. Each of the bowls curve upwards in a slightly concave configuration.

Figure 2:
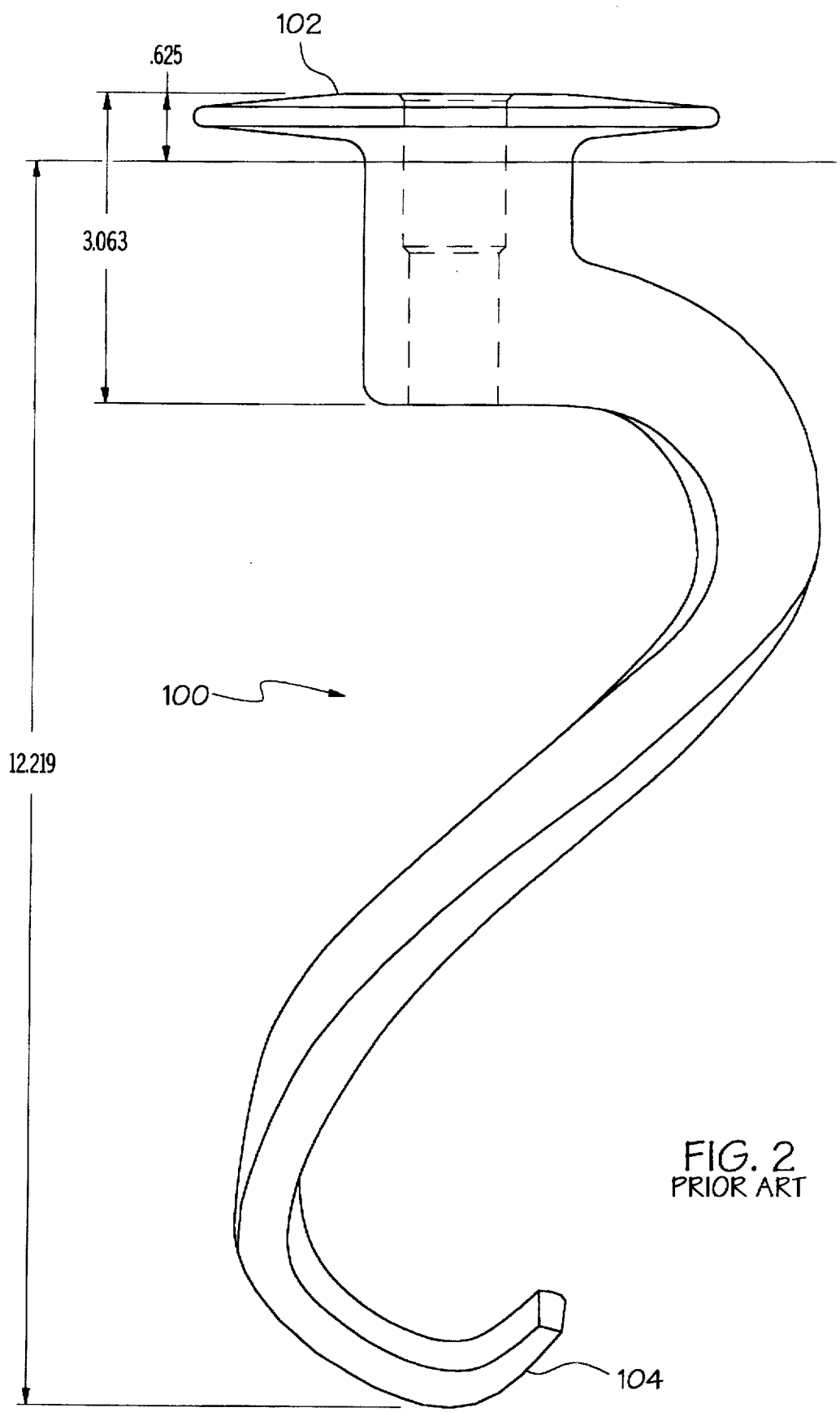
FIG. 2 is a conventional dough hook.

A conventional dough hook 100 is shown in FIG. 2. It is one of a pair which act together to knead the dough. The hooks are formed so that upon rotation, dough being kneaded is forced downward from the hooks, thereby preventing the dough from rising along the hooks towards the housing. The hook 100 is helical in shape and has a proximal end 102 which removably connects to an accessory attachment 30 of a mixer head, and a distal end 104 which projects into the bowl and is slightly curled upwards. Throughout the length of the hook, the cross-section is angular and changing.

The dough hook of a 20 quart mixer is provided with a helix having a lead of about 3.063 inches with a 0° rotation at point A, which is about 35° across the horizontal line. The hook is between about 12.157 and about 12.281 inches long. The second hook is not shown. One hook has a right hand helical profile and the other has a left hand helical profile which is a mirror image of the right hand hook. The helices overlap as they are rotated.

Figure 3:
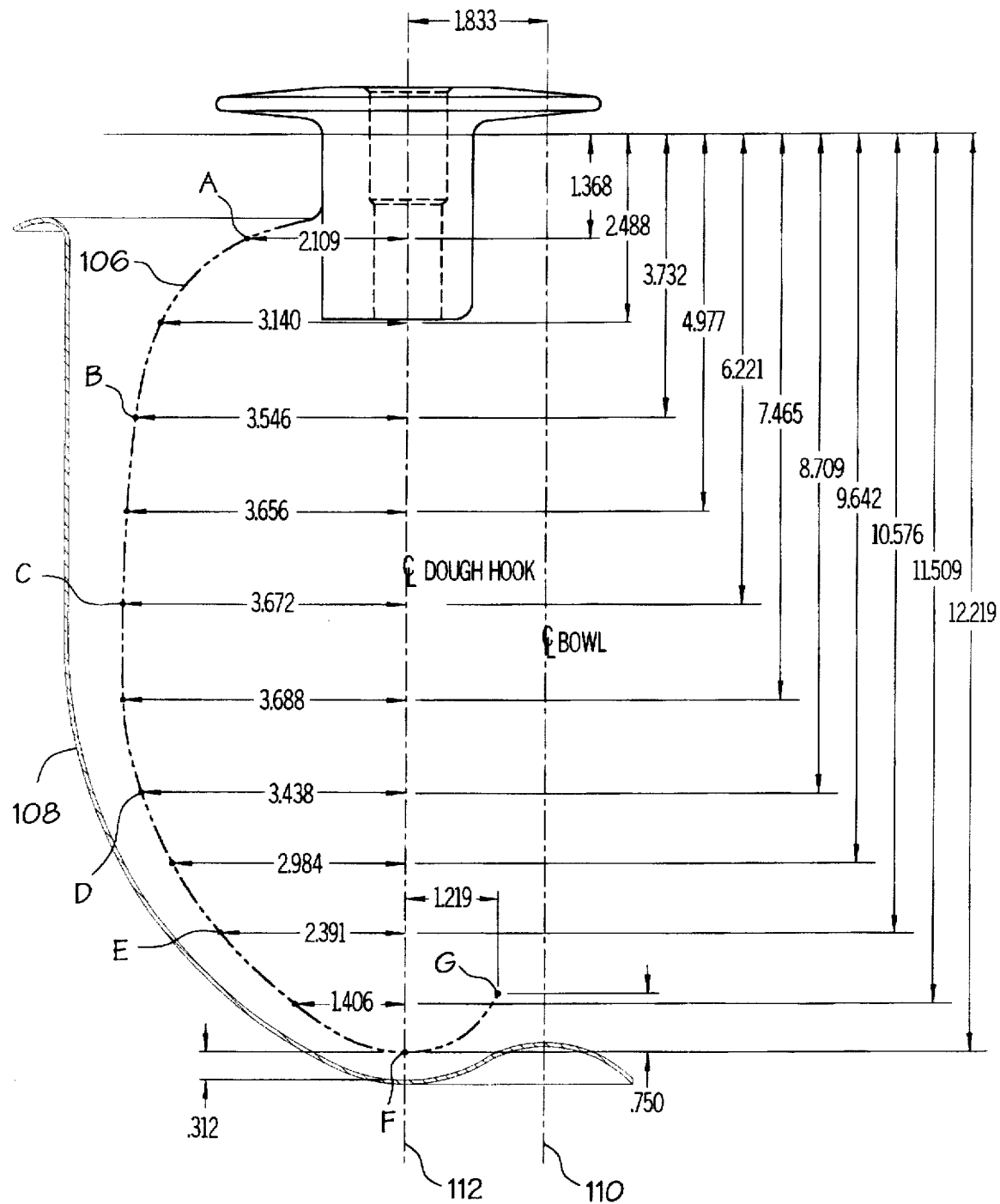
FIG. 3 is a representation of the clearance between the reach of the dough hook of FIG. 2 and the inner surface of a bowl.

FIG. 3 shows the clearance between the dough hook reach 106 (i.e. the point of the hook 100 which is closest to the inner periphery of the bowl as the hook is rotated) and the inner curvature of the bowl 108 for a conventional 20 quart capacity mixer. The distance from the centerline of the bowl 110 to the centerline of the dough hook 112 is 1.833 inches. The following table shows the distances from the centerline of the dough hook and the baseline of the dough hook for seven points along a common edge of the dough hook. The angle of rotation is defined with respect to point A being 0°

| Point | Distance from Centerline | Distance from Baseline | Angle of Rotation |
| --- | --- | --- | --- |
| A | 2.109 | 1.368 | 0 |
| B | 3.546 | 3.732 | 20.5 |
| C | 3.672 | 6.221 | 71.5 |
| D | 3.438 | 8.709 | 106 |
| E | 2.391 | 10.576 | 140 |
| F | 0 | 12.219 | 180 |
| G | 1.219 | 11.531 | 394 |

Point A is in the plane of the bowl, perpendicular to and 1.368 inches from the proximal end 102 of the hook. Point F is closest to the bottom of the bowl and is about 12.219 inches from the end. The point F is about 0.375 inches from the interior periphery of the bowl. Point G is on the curl.

As can be seen, the clearance at points C, D and E in the mid-portion of the bowl, where the top of the dough would be, is relatively small. As explained above, this requires excess force to move the dough and greatly reduces the usable life of the mixing machine.

Figure 4:
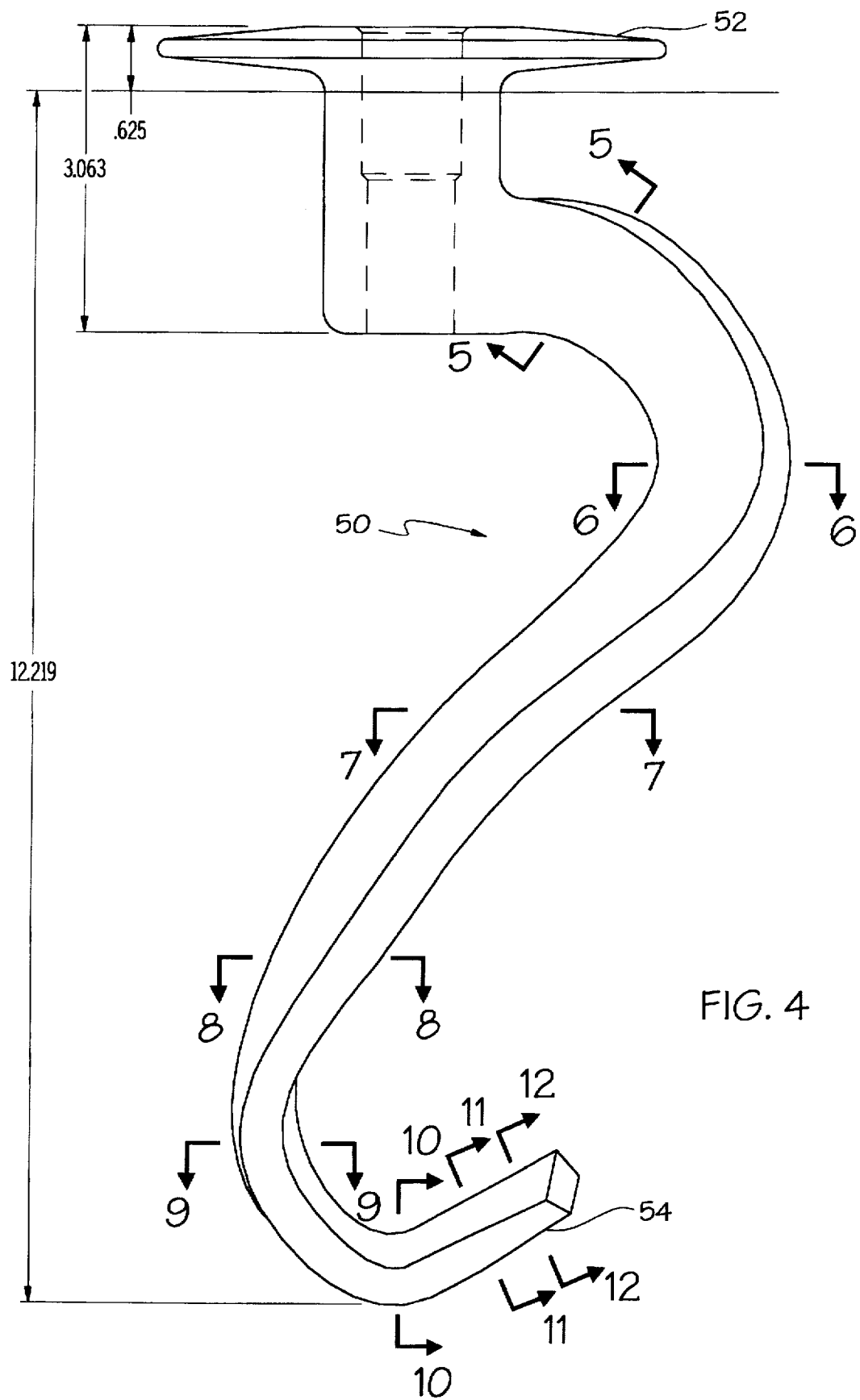
FIG. 4 is a dough hook according to the present invention.

The dough hook 50 of the present invention for a similar 20 quart capacity mixer is shown in FIG. 4. It has a similar spiral shape to the conventional dough hook 100 shown in FIG. 2. However, the shape has been altered so that the clearance between the reach of the hook 56 as it is rotated and the inner surface of the bowl 58 is maximized with respect to minimum required mixer energy and maximum mixing ability. A further differentiation is that the curled end 54 is longer, for better flour incorporation.

This dough hook has a helix having a lead of 3.063 inches as in the conventional hook of FIG. 2. It has a 0° rotation at the C—C section, which is about 350 across the horizontal line. The hook is between about 12.157 and about 12.281 inches long as in the conventional hook.

The cross-sectional views of the helical shaft portion of the dough hook are shown in FIGS. 5-12 taken at points 5—5, 6—6, 7—7, 8—8, 9—9, 10—10, 11—11, and 12—12 respectively. The cross-sections all have a common edge.

Figure 13:
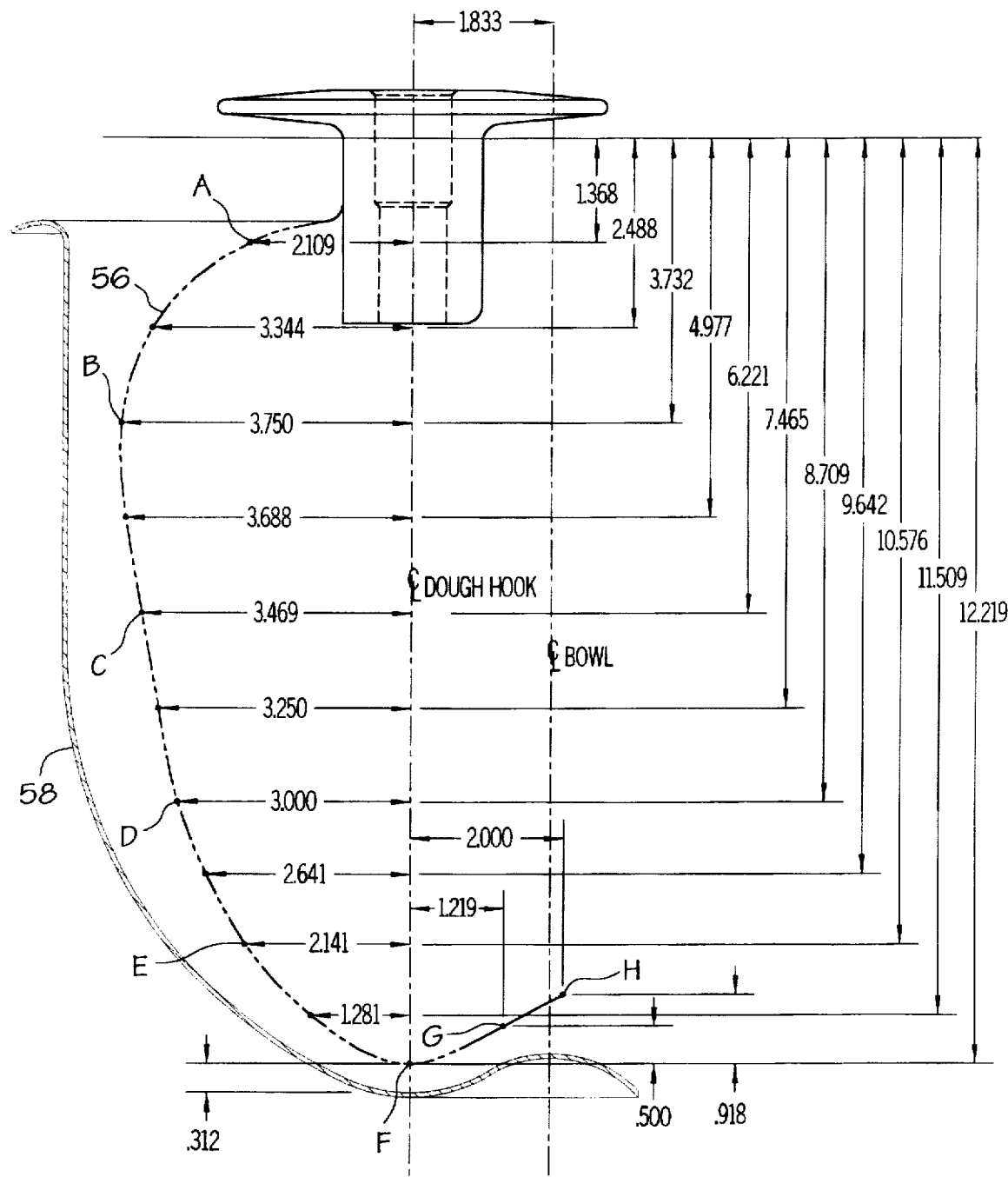
FIG. 13 is a representation of the clearance between the reach of the dough hook of FIG. 4 and the inner surface of a bowl.

FIG. 13 shows the clearance between the reach 56 of the dough hook 50 and the inner edge 58 of the mixing bowl. Points A–G are at the same rotation and distance from proximal end 52 as on FIG. 3. All distances have tolerances of ±0.050 inches. However, as the curled portion of the hook 54 is longer, an eighth point H is shown which is rotated 394° from point A and is 0.918 inches from the bottom most portion of the hook at point F. The following table shows the distances from the centerline of the dough hook and the baseline of the dough hook for eight points along a common edge of the dough hook. The angle of rotation is defined with respect to point A being 0°

| Point | Distance from Centerline | Distance from Baseline | Angle of Rotation |
| --- | --- | --- | --- |
| A | 2.109 | 1.368 | 0 |
| B | 3.750 | 3.732 | 20.5 |
| C | 3.469 | 6.221 | 71.5 |
| D | 3.00 | 8.709 | 106 |
| E | 2.141 | 10.576 | 140 |
| F | 0 | 12.219 | 180 |
| G | 1.219 | 11.781 | 394 |
| H | 2.000 | 11.363 | 394 |

As can be clearly seen by contrasting FIGS. 3 and 13, the clearance between the reach of the hook and the bowl is less at point B where there is usually no dough, but much larger at points C, D, and E. The distance at point C from the center line of the dough hook to the reach is 3.469 as compared to the 3.672 inches of the prior art dough hook. At point D, the distance from the centerline of the dough hook to the reach is 3 inches verses the 3.438 inches of the prior art dough hook.

The numbers shown for these two examples are for a 20 quart bowl however, the clearance will be proportional for larger capacity mixers and smaller capacity mixers (i.e., larger mixers should have a bigger clearance and smaller mixers will have a smaller clearance.) However, for a 20 quart mixer, the lower portion clearance should not exceed approximately 0.7 inches. The dimensions of a dough hook for a 30 quart mixer 35 0.050 inches are provided in the following table which shows the distances from the centerline of the dough hook and the baseline of the dough hook for eight points along a common edge of the hook. The angle of rotation is defined with respect to point A being 0°.

| Point | Distance from Centerline | Distance from Baseline | Angle of Rotation |
| --- | --- | --- | --- |
| A | 1.844 | 2.060 | 0 |
| B | 4.219 | 4.750 | 20.5 |
| C | 4.125 | 7.938 | 71.5 |
| D | 4.300 | 11.000 | 106 |
| E | 2.875 | 13.438 | 140 |
| F | 0 | 15.469 | 180 |
| G | 1.125 | 14.764 | 394 |
| H | 2.250 | 14.059 | 394 |

The dimensions of a dough hook for use in a 10 quart mixer ±0.050 are shown in the following table in which the distances from the centerline and the baseline of the dough hook are provided for eight points along a common edge of hook. The angle of rotation is defined with respect to point A being 0°.

| Point | Distance from Centerline | Distance from Baseline | Angle of Rotation |
| --- | --- | --- | --- |
| A | 2.219 | 2.250 | 0 |
| B | 2.750 | 4.250 | 50 |
| C | 2.657 | 6.250 | 100 |
| D | 2.297 | 7.250 | 125 |
| E | 1.625 | 8.250 | 150 |

-continued

| Point | Distance from Centerline | Distance from Baseline | Angle of Rotation |
|-------|--------------------------|------------------------|-------------------|
| F     | 0                        | 9.250                  | 180               |
| G     | 1.000                    | 8.250                  | 366               |
| H     | 1.609                    | 7.250                  | 380               |

EXAMPLE

Different doughs including medium bread dough, 40% pizza dough, 50% pizza dough, and pretzel dough were used in a 20 quart mixer. A comparison chart is in the table below. The table shows prolonged life of the mixer major parts (shafts, gears, bearings, and hooks) in different loads by using the hook of the present invention as compared to the prior art dough hook.

For shaft, gear and hook life analysis, the fatigue strength theory is used:

$S_f = aN^b$; where $S_f$=material fatigue strength $a = (0.9\ S_{ut})^2 / S_e$ $b = -1/3\ \log((0.9\ S_{ut})/S_e)$  $b = -0.0851$ for steel $(S_{ut}/S_e = 2)$ $b = -0.139$ for aluminum $(S_{ut}/S_e = 32/11)$ N=cycles $S_e$=material fatigue limit $S_{ut}$=material tensile strength for bearing calculation: p1

$L2/L1 = (F1/F2)^a$; where

1=old

2=new

L=life

F=force a=3 (constant for ball bearings)

| Product | Life ratio Shaft/Gear | Life Ratio Bearing | Life Ratio Hook |
|---------|-----------------------|--------------------|-----------------|
| 60% AR Medium Bread Dough | | | |
| old hook | 1 | 1 | 1 |
| new hook | 22 | 2.2 | 6.6 |
| 40% AR Pizza Dough | | | |
| old hook | 1 | 1 | 1 |
| new hook | 3547.4 | 8.1 | 146.6 |
| 50% AR Pizza Dough | | | |
| old hook | 1 | 1 | 1 |
| new hook | 365.2 | 4.5 | 36.6 |
| Pretzel Dough, Type 1 | | | |
| old hook | 1 | 1 | 1 |
| new hook | 17.5 | 2.1 | 5.7 |
| Pretzel Dough, Type 2 | | | |
| old hook | 1 | 1 | 1 |
| new hook | 25.5 | 2.3 | 7.2 |

This table shows prolonged life of mixer major parts (shafts, gears, bearings, and hooks) in different loads. Several times the test could not be finished for mixing the 50% pizza dough with the conventional dough hook since there were too many on start windings which could damage the testing equipment. Even dough which is not very heavy, damaged the unit when the old hook was heavily used. Some of the results reported that the new hook required a longer mixing time. However, the hook of the present invention greatly increases the mixer reliability and lifetime.

Having described the invention in detail and by reference to preferred embodiments thereof, it will be apparent that modifications and variations are possible without departing from the scope of the invention defined in the appended claims.

What is claimed is:

1. A mixer for mixing dough comprising:

a housing portion of said mixer;

a mixing bowl removably positioned on said housing;

a mixer head attached to said housing portion and driven by a motor;

at least one dough hook mounted in said mixer head for kneading dough contained in said mixing bowl, said dough hook having a helical portion, wherein an outer reach of said helical portion of said dough hook and an inner surface of said mixing bowl form a clearance, said clearance being of an amount small enough to effectively mix dough but not so small that the dough is pinched to a degree that said motor oscillates on/off and overheats, said clearance being about 0.7 inches in a 20 quart bowl.

2. A dough hook for a planetary mixer which comprises:

a shaft portion for attaching said hook to a mixer head; and a hook portion having a plurality of points located on a common edge of said hook portion, said points being located approximately as follows:

| Distance from Centerline of Hook Portion (in.) | Distance from Baseline of Hook Portion (in.) | Angle of Rotation (degrees) from a Fixed Point on said Hook Portion |
|---|---|---|
| 3.5 | 6.2 | 71.5 |
| 3.0 | 8.7 | 106 |
| 2.1 | 10.6 | 140 |
| 0 | 12.2 | 180 |

3. The dough hook of claim 2 wherein said hook portion has a trapezoidal cross-section.

4. The dough hook of claim 2 wherein said points are located approximately as follows:

| Distance from Centerline of Hook Portion (in.) | Distance from Baseline of Hook Portion (in.) | Angle of Rotation (degrees) from a Fixed Point on said Hook Portion |
|---|---|---|
| 3.47 | 6.22 | 71.5 |
| 3.00 | 8.71 | 106 |
| 2.14 | 10.58 | 140 |
| 0 | 12.22 | 180 |

5. The dough hook of claim 2 further comprising points located approximately as follow:

| Distance from Centerline of Hook Portion (in.) | Distance from Baseline of Hook Portion (in.) | Angle of Rotation (degrees) from a Fixed Point on said Hook Portion |
|---|---|---|
| 2.1 | 1.4 | 0 |
| 3.7 | 3.7 | 20.5 |

6. A dough hook for a planetary mixer which comprises:

a shaft portion for attaching said hook to a mixer head; and a hook portion having a plurality of points located on a common edge of said hook portion, said points being located approximately as follows:

| Distance from Centerline of Hook Portion (in.) | Distance from Baseline of Hook Portion (in.) | Angle of Rotation (degrees) from a Fixed Point on said Hook Portion |
| --- | --- | --- |
| 4.1 | 7.9 | 71.5 |
| 4.3 | 11.0 | 106 |
| 2.9 | 13.4 | 140 |

7. The dough hook of claim 6 wherein said hook portion has a trapezoidal cross-section.

8. The dough hook of claim 6 wherein said point are located approximately as follow:

| Distance from Centerline of Hook Portion (in.) | Distance from Baseline of Hook Portion (in.) | Angle of Rotation (degrees) from a Fixed Point on said Hook Portion |
| --- | --- | --- |
| 4.12 | 7.94 | 71.5 |
| 4.30 | 11.00 | 106 |
| 2.87 | 13.44 | 140 |

9. A dough hook for a planetary mixer which comprises:
a shaft portion for attaching said hook to a mixer head; and
a hook portion having a plurality of points located on a common edge of said hook portion,
said points being located approximately as follows:

| Distance from Centerline of Hook Portion (in.) | Distance from Baseline of Hook Portion (in.) | Angle of Rotation (degrees) from a Fixed point on said Hook Portion |
| --- | --- | --- |
| 2.7 | 6.2 | 100 |
| 2.3 | 7.2 | 125 |
| 1.6 | 8.2 | 150 |

10. The dough hook of claim 9 wherein said hook portion has a trapezoidal cross-section.

11. The dough hook of claim 9 wherein said points are located approximately as follow:

| Distance from Centerline of Hook Portion (in.) | Distance from Baseline of Hook Portion (in.) | Angle of Rotation (degrees) from a Fixed Point on said Hook Portion |
| --- | --- | --- |
| 2.657 | 6.250 | 100 |
| 2.297 | 7.250 | 125 |
| 1.625 | 8.250 | 150 |

* * * * *

UNITED STATES PATENT AND TRADEMARK OFFICE
CERTIFICATE OF CORRECTION

PATENT NO. : 5,758,963
DATED : June 2, 1998
INVENTOR(S) : Mark Mingjun Xie, et al.

It is certified that error appears in the above-indentified patent and that said Letters Patent is hereby corrected as shown below:

Claim 5, col. 6, line 54, the word "follow" should be - - follows - - .

Claim 8, col. 7, line 13, the word "point" should be - - points - -.

Claim 8, col. 7, line 14, the word "follow" should be - - follows - -.

Claim 11, col 8, line 16, the word "follow" should be - - follows - -.

Signed and Sealed this

Eighteenth Day of August, 1998

Attest:

BRUCE LEHMAN

Attesting Officer

Commissioner of Patents and Trademarks